Feb. 25, 1969    M. J. DE GOOD ET AL    3,429,417
MOTORIZED FLOW DIVERTER

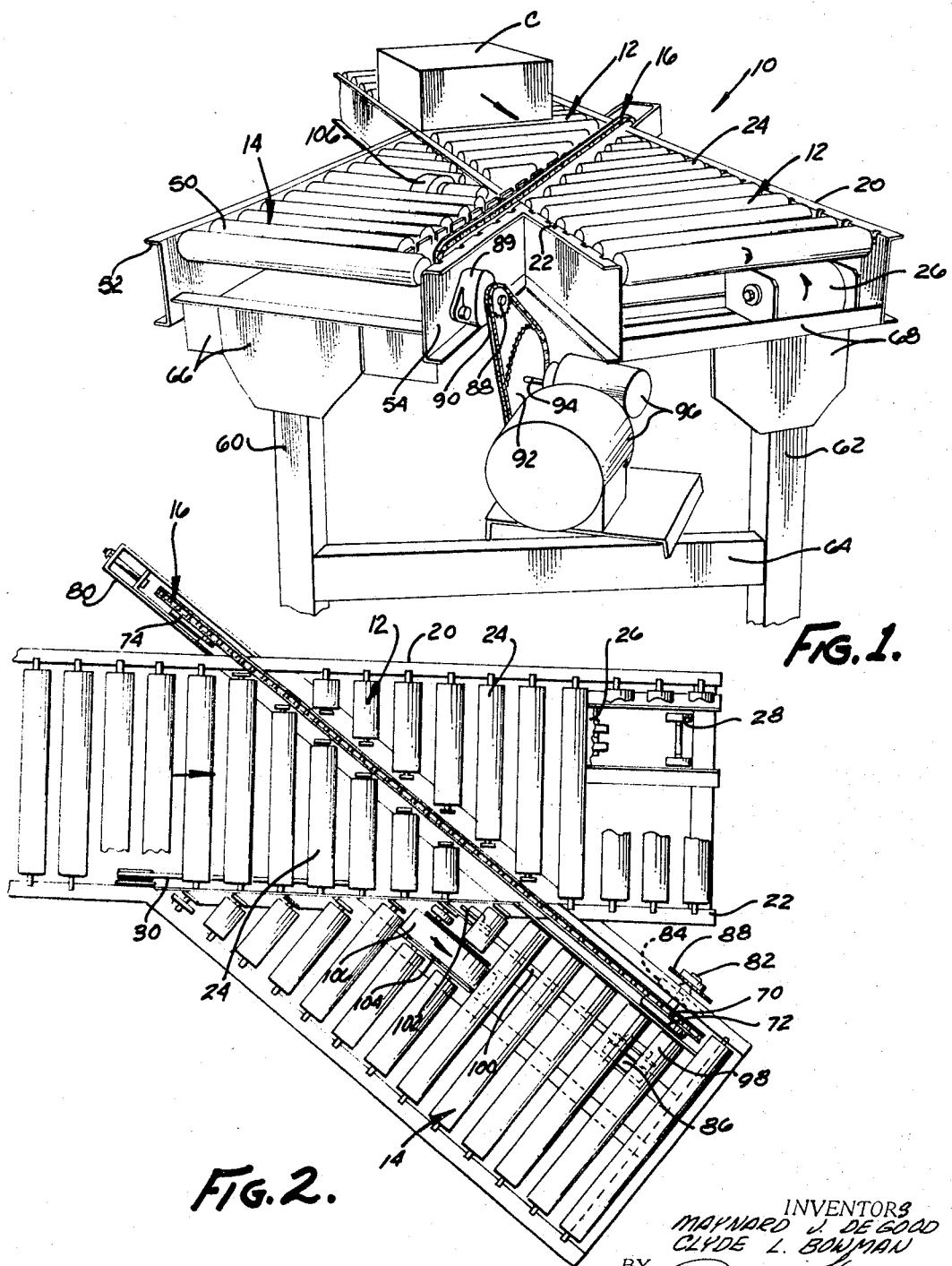

Filed Jan. 20, 1967    Sheet 2 of 2

INVENTORS
MAYNARD J. DE GOOD
CLYDE L. BOWMAN
BY
*Price & Heneveld*
ATTORNEYS

3,429,417
MOTORIZED FLOW DIVERTER

Maynard J. De Good and Clyde L. Bowman, Grand Rapids, Mich., assignors to Rapistan Incorporated, Grand Rapids, Mich., a corporation of Michigan
Filed Jan. 20, 1967, Ser. No. 610,631
U.S. Cl. 198—31     3 Claims
Int. Cl. B65g 47/52

ABSTRACT OF THE DISCLOSURE

A positive acting, selective, powered, barrier-diverter for a conveyor, being selectively positioned as a barrier directly into and across the path of articles on the conveyor, and having dynamic motion diagonally across the conveyor path to turn and divert articles to an article receiving surface such as a branch conveyor.

Background

The invention relates to conveyor apparatus, and more particularly to article diverting and propelling mechanism to remove articles laterally from a conveyor surface.

Many types of lateral diverters exist for shifting articles laterally from a conveyor, including powered diverters. Known powered diverters advance articles laterally off a conveyor by having first mechanism which shifts the article to the conveyor side edge from which it will be removed, and having second mechanism which rises into engagement with the under surface of the article to propel it laterally. The first as well as the second mechanism noted is almost always necessary, from a practical standpoint, to control selective diversion of cartons of varying sizes, or else small cartons tend to pass by the diverter. A greater problem is encountered with heavy cartons, since their momentum frequently causes them to override the frictional force of the diverting member elevated against the carton bottom, causing uncontrolled and even violent skewed shifting of the carton at the conveyor and diverter function, and often resulting in continued passage of the carton past the diverter.

As a consequence, although diverters of the type in U.S. patents to De Good et al. 3,269,519, Burt Re. 25,673, and Pollard 3,191,747 are very useful for certain types and sizes of articles, there is a definite need for power diverting apparatus capable of positively and reliably effecting selective diversion of cartons of all sizes and weights, even heavy cartons, at rapid rates.

Summary

It therefore is an object of this invention to provide a positive acting, selective, powered, barrier-diverter structure for a conveyor system, capable of reliably diverting even heavy articles such as cartons of heavy goods, from a conveyor path, at a rapid rate, to prevent disruption of following articles. The diverter means is selectively positioned above the conveyor surface at controlled times to intercept the article as a flow barrier, and is advanced diagonally across the path to divertingly propel the article.

Another object of this invention is to provide one form of barrier-diverter that is elevatable from a lowered position beneath the conveyor surface to an elevated barrier-diverter position above it, such diverter being constantly powered and recirculating whether lowered or elevated.

Another object of this invention is to provide a second form of barrier-diverter with articulated barrier means only at spaced intervals along a recirculatory drive means, and with the drive means being intermittently selectively energized to create a temporary barrier-diverter of selected articles.

These and other objects of this invention will be apparent from the description, considered with the drawings.

Drawings

FIG. 1 is a perspective view of a main conveyor and a branch conveyor, employing one form of the novel diverting apparatus;

FIG. 2 is a plan view of the assembly in FIG. 1;

Description of the preferred embodiments

Figure 4:
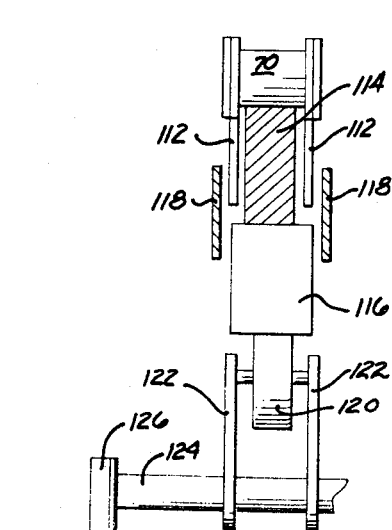
FIG. 4 is a fragmentary, enlarged, end view of the vertically shifting portion of the diverting mechanism in FIGS. 1 through 3.

Referring now specifically to the drawings, the first form 10 of the conveyor system in FIG. 1 includes a main conveyor 12, an article receiving surface 14, preferably in the form of a branch or spur conveyor, extending from the main conveyor, and overlapping diverting mechanism 16.

Main conveyor 12 includes a pair of spaced parallel side rails 20 and 22, between which are mounted a plurality of rotatable, low friction article supports, here shown as elongated rollers 24 forming a conveyor surface. These article supports can alternatively be conveyor wheels or some other means forming a conveyor surface. This conveyor is preferably powered, as by a continuous powered belt 26 supported on underlying pressure rollers 28 (FIG. 2). The pressure rollers engage the underside of the belt and hold it up against the underside of rollers 24 to power them. Since diverting apparatus 16 projects diagonally across the main conveyor, the last several rollers 24', adjacent the edge of the main conveyor from which the articles are to be diverted, are shortened to enable the diverting mechanism to fit within the confines of the main conveyor. These shortened rollers are preferably driven by a secondary power belt 30. This drive relationship of the main conveyor can vary greatly. The mechanism may be a gravity conveyor within the scope of this invention.

Throughout this specification, the terminology "main conveyor" is used for convenience to designate a conveyor from which article are diverted by the diverting mechanism. In use, it actually may be any one of several conveyors in a system, and therefore is to be understood in this context.

As stated previously, articles such as carton C (FIG. 1) are intended to be selectively diverted from main conveyor 12 onto the laterally positioned receiving surface such as a platform or table, or a typical spur or branch conveyor 14. This particular branch conveyor is shown to include a plurality of rotatable, low friction, parallel, cylindrical, article supports 50, rotatably suspended between a pair of parallel side rails 52 and 54. This spur conveyor is at an obtuse angle, preferably about 135°, to the main conveyor. This angle may vary. The rollers of the spur conveyor may be powered if desired, for example with drive mechanism like that shown for the main conveyor.

The entire conveyor apparatus is suitably mounted on support means such as support columns 60 and 62, here shown to be secured together by cross beam 64 and secured to the respective branch and main conveyors by girder structure 66 and 68.

Figure 3:
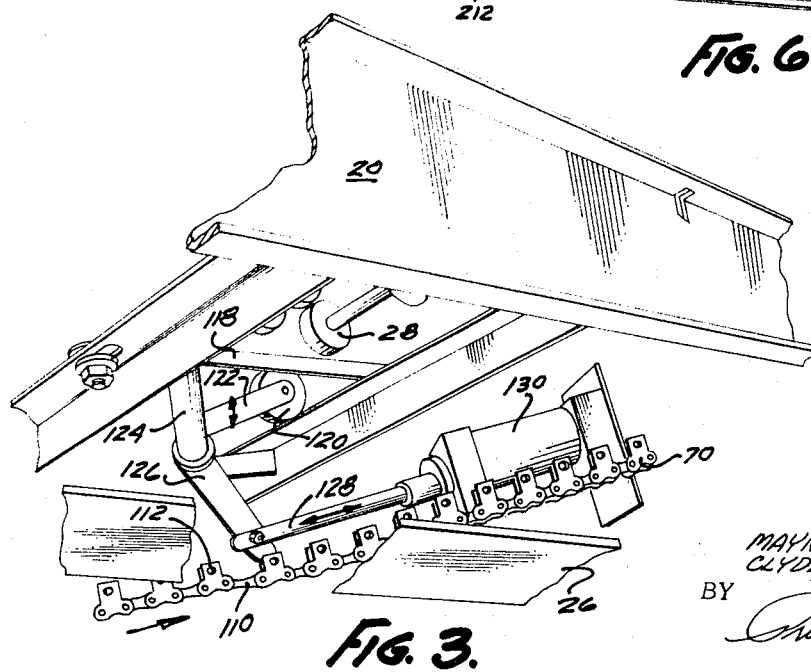
FIG. 3 is a fragmentary enlarged perspective view of the underside of the diverting mechanism in the apparatus in FIGS. 1 and 2.

The first form of diverter mechanism 16 illustrated in FIGS. 1 through 3 includes an endless recirculatory element such as roller chain 70 mounted to recirculate about a pair of sprockets 72 and 74. These are arranged on opposite sides of the main conveyor, and are aligned with the side edge of branch conveyor 14 which is downstream of the main conveyor 14, with respect to article flow along the main conveyor. Sprocket 74 and its shaft are rotatably journaled on a support structure 80 mounted to and projecting from the side edge of main conveyor 12 opposite the side edge from which the article is to be diverted. Sprocket 72 is mounted on a shaft 82 which projects through the downstream side edge of branch conveyor 14, and which is rotatably mounted by bearings 84 and 86. A drive sprocket 88 is attached to the outer end of shaft 82. Sprocket 88 is driven by roller chain 90, which in turn is driven by sprocket 92 mounted on output shaft 94 of gear box-electrical motor combination 96.

Also mounted on shaft 82 is a sprocket 98 which drives chain 100 (shown in phantom in FIG. 2) that drives sprocket 102 mounted on rotational shaft 104 of an accelerator or exciter wheel 106. The upper peripheral portion of this vertical wheel projects slightly above the conveyor surface of branch conveyor 14, preferably in the center of this branch conveyor, to assure acceleration of diverting articles down the branch conveyor by frictionally engaging the under surface thereof.

The roller chain 70 is made up of a plurality of interconnected links 110 which have spaced pairs of parallel guide and retention plates 112 integrally connected therewith. The plates 112 project radially inwardly of the circuitous path, so that, during the upper pass of the roller chain, when it moves adjacent the main conveyor surface, these plates of flanges 112 project downwardly on both sides of an elongated guide track 114. Track 114 may be formed of an elongated bar, generally rectangular in cross section, projecting across the main conveyor. These stabilize the chain as side thrust is imparted to the chain by packages being diverted, in a manner to be explained hereinafter. Guide track 114 rests upon another elongated support 116 in the embodiment shown, with support 116 being vertically shiftable. Support 116 preferably is pivotally mounted on its downstream end, for elevation about this pivot axis, or may be freely vertically floatable. Vertical movement of member 114 and 116 between a pair of fixed side panels is achieved by a vertically shiftable cam roller 120 in engagement with the under surface of support 116 intermediate its ends. Roller 120 is in turn rotatably mounted to one end of a pair of parallel links 122. The other end of the links is secured to a pivotal shaft 124. Also extending radially from shaft 124 is link 126 which is connected on its opposite end with the extended piston rod 128 of a fluid cylinder 130. Cylinder 130 is fixed to the under structure of the main conveyor. Retraction of the cylinder rod 128 causes roller 120 to be vertically elevated, pushing support 116, track 114, and roller chain 70 upwardly from a first lowered position where the roller chain is recessed beneath the conveying surface of the main conveyor and branch conveyor, to an elevated position where the roller chain projects upwardly above these conveying surfaces directly in line with articles on the main conveyor. The roler chain in this second position therefore projects directly across the path of a typical carton C on main conveyor 12, acting as a barrier for this carton.

Roller chain 70 is continuously power driven during use of the conveyor, when chain 70 is in the elevated or the lowered position. Therefore, when it is elevated, it not only acts as a barrier, but also turns the carton to orient it with the branch conveyor, and diagonally propels the carton that is forced against the chain by the feed of the main conveyor. The carton is positively diverted in a rapid manner. This diverting chain is driven at a speed greater than the main conveyor speed to assure turning of the carton and rapid diverting out of the path of succeeding cartons.

Second embodiment

Figure 7:
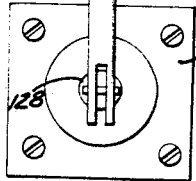
FIG. 7 is an enlarged, fragmentary view of a portion of the continuous roller chain and track of the second form of the apparatus.
Figure 6:
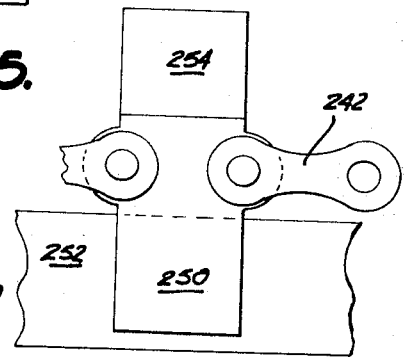
FIG. 6 is a perspective view of a second form of the barrier-diverter mechanism, showing in combination a main conveyor and a branch conveyor.

In FIGS 6 and 7, a second embodiment of the concept is shown. This modified conveyor assembly 210 includes a main conveyor 212 along which articles are adapted to pass in the direction indicated by the arrow, and a side or branch conveyor 214 onto which articles are to be diverted. Main conveyor 212 includes side rails 216 and 218 between which a plurality of rotatable elements 220 are mounted to form a main conveyor surface. Spur conveyor 214 includes side rails 222 and 224 between which the plurality of rotatable elements 226 are mounted to form a receiving surface. An accelerator wheel 230, similar to wheel 106 in FIG. 1, may be employed on the branch conveyor. The rollers on the main conveyor may be powered in the manner illustrated in FIG. 1. The rollers on the side conveyor may be powered as desired, for example as illustrated in FIG. 1 with respect to the main conveyor.

The diverting apparatus 240 in this instance also includes an elongated continuous recirculating roller chain 242 that has an upper pass adjacent the conveyor surface, and a lower return pass. This chain is mounted on suitable sprockets on opposite sides of the main conveyor, and is oriented diagonally of the main conveyor and parallel with the spur conveyor. The spur conveyor is at an obtuse angle to the main conveyor.

Figure 5:
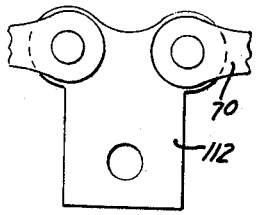
FIG. 5 is an enlarged elevational view of a segment of the chain forming part of the barrier-diverter in FIGS. 1 through 4.

The actual roller chain construction of the diverter varies from the construction in the first embodiment, as is clear from a contrast of FIGS. 7 and 5. The modified roller chain 242 has pairs of parallel depending retention flanges 250 mounted at spaced intervals along the links, and projecting radially inwardly similar to flanges 112 on roller chain 70 in FIG. 5. These straddle a track 252. It also has a plurality of spaced barriers, each formed of a plurality of adjacent, radially outwardly extending plates 254 to form articulated, controlled-position, barriers. Each group of plates forms an articulated vertical barrier to an article on the main conveyor. In this embodiment, the chain 242 itself always remains recessed slightly below the conveying surface of the main conveyor. It need not shift vertically. Rather, the selective barrier-diverter function is fulfilled by controlled activating and deactuating the diverter chain, to controllably position the articulated barriers.

Hence, when the chain is in the position illustrated in FIG. 6, an article on the main conveyor will continue to pass along the main conveyor and not be diverted since its path is unobstructed. The chain can be moved because it is powered as by the type of power motor means shown in FIG. 1. It may include the same drive chain and sprocket combination illustrated in FIG. 1. This power means is intermittently controlled, as by an electrical switch to the electrical motor, to selectively activate the chain for a short interval of time, to position the barrier means formed of the plurality of projections 254 across the main conveyor surface. These barrier elements project above the conveyor surface, directly into the path of an article to positively limit its motion along the main conveyor. After the chain is actuated to position a barrier, the chain continues to operate to intercept the carton, turn it in the direction of the spur conveyor, and continue to divertingly advance the carton toward the side conveyor by frictional engagement of the forwardly driven carton against the diagonally advancing articulated barrier.

During operation of this modified assembly therefore, the protruding barriers are normally maintained out of the path of cartons on the main conveyor so that the cartons can normally pass, but selected ones can be diverted. To divert a carton, the motor is actuated to advance roller chain 242 in a manner to cause the articulated barrier to intercept and divert the carton as it reaches the diverting means. The carton strikes this barrier, and, due to the movement of the barrier at a speed greater than the carton movement, the carton is caused to be turned and propelled in the direction of the spur conveyor. As the articulated barrier leaves the vicinity of the main conveyor surface, the roller chain is deactuated by a suitable limit switch 280 actuated by the succeeding articulated barrier which approaches the opposite side edge of the main conveyor. The chain then remains inactive until another package is to be selectively diverted. The chain is stabilized against the force imparted by the cartons by being held on its track with its track straddling flanges.

From a study of the two foregoing forms of the invention, it will be realized that these have certain features in common, but that they also have features which are unique unto themselves. Normally it has been found that the first form of the device described is preferable because it is capable of handling cartons immediately behind each other without requiring any significant spacing therebetween. The second form of the device has the advantage of not requiring the roller chain to be controllably elevated, but normally requires that packages be spaced from each other. Both will reliably divert even heavy cartons at rapid rates. It is conceivable that certain structural variations could be made on the forms of the device shown without departing from the concept presented. Hence, the invention is intended to be limited only by the scope of the appended claims and the reasonably equivalent structures to those defined therein.

We claim:

1. An article transporting conveyor apparatus having means forming an elongated conveyor surface and an article receiving surface alongside said conveyor surface, the improvement comprising: a selective, powered, barrier-diverter oriented across said elongated conveyor surface toward said receiving surface, having a continuous, recirculating roller chain having an upper pass forming article barreir and diverting portions movable from a first position out of the path of articles on said conveyor surface, to a second position above said conveyor surface directly in the path of articles on said conveyor surface to form a barrier to the articles and thereby positively limit the advancement of articles along said conveyor surface by allowing the articles to strike said barrier, said roller chain also having a return pass beneath said conveyor surface, said roller chain upper pass portions being powered toward said receiving surface to propel articles striking said portions from said conveyor surface onto said receiving surface vertically shiftable track means supporting said roller chain upper pass, and power means to vertically shift said track means and thereby shift said roller chain upper pass between said first and second positions to selectively limit the advancement of and divert articles.

2. The apparatus in claim 1 wherein said roller chain has depending retention flanges straddling said track for restraining said chain in stabilized condition on said track.

3. The apparatus in claim 2 including supplemental article propelling means on said receiving surface offset from said conveyor surface.

References Cited

UNITED STATES PATENTS

| | | | |
|---|---|---|---|
| Re 25,673 | 11/1964 | Burt. | |
| 3,232,417 | 2/1966 | Muller | 198—185 |
| 3,303,923 | 2/1967 | Davis | 198—185 |

EDWARD A. SROKA, *Primary Examiner.*